United States Patent
Chen et al.

(10) Patent No.: US 6,343,798 B1
(45) Date of Patent: Feb. 5, 2002

(54) SCOOTER

(76) Inventors: Shou Mao Chen, 344, Sec. 1, Chung Shan Rd., Ta Cha Township, Taichung Hsien (TW); Han Lin, 1161 E. Sandhill, Unit D, Carson, CA (US) 90746

( * ) Notice: Subject to any disclaimer, the term of this patent is extended or adjusted under 35 U.S.C. 154(b) by 0 days.

(21) Appl. No.: 09/677,755

(22) Filed: Oct. 3, 2000

(51) Int. Cl.[7] ................................. B62M 1/00
(52) U.S. Cl. ..................... 280/5.26; 280/87.05
(58) Field of Search ................. 280/5.2, 5.26, 280/5.28, 87.01, 87.021, 87.041, 87.05

(56) References Cited

U.S. PATENT DOCUMENTS

| | | | |
|---|---|---|---|
| 4,264,085 A | * | 4/1981 | Volin |
| 4,790,548 A | * | 12/1988 | Decelles et al. |
| 5,419,570 A | * | 5/1995 | Bollotte |
| 5,620,189 A | * | 4/1997 | Hinderhofer |

* cited by examiner

Primary Examiner—Kevin Hurley
(74) Attorney, Agent, or Firm—Harrison & Egbert (57) ABSTRACT

A scooter including a footboard, a rear wheel, a front wheel rod fastened to the front end of the footboard in conjunction with a folding member, a handlebar fastened to the top end of the front wheel rod, a wheel frame fastened to the bottom end of the front wheel rod, and a front wheel member fastened pivotally to the wheel frame and formed of three front wheels to stabilize the scooter in motion. Two of the three front wheels are in contact with the ground surface, with the remaining one front wheel being pivoted over the two front wheels such that the remaining one front wheel is capable of swiveling to come in contact with the ground surface at the time when one of the two front wheels encounters an obstacle. The folding member enables the front wheel rod to swivel toward the footboard so as to facilitate the storage or transportation of the scooter.

2 Claims, 12 Drawing Sheets

SCOOTER

BACKGROUND OF THE INVENTION

1. Field of the Invention

The present invention relates generally to a scooter, and more particularly to a scooter which is foldable and has means to enhance the performance of the scooter.

2. Description of Related Art

Figure 1:
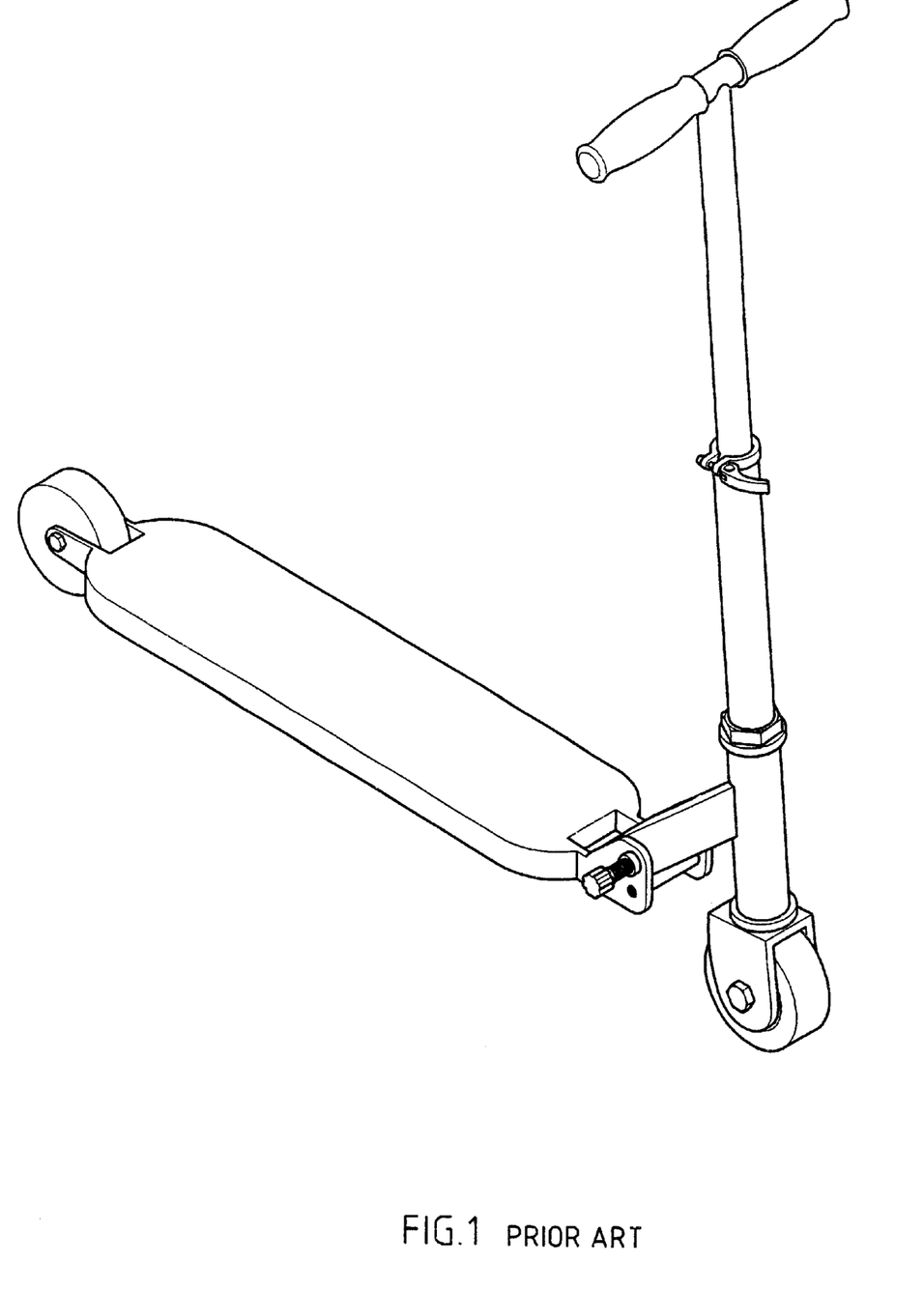
FIG. 1 shows a perspective view of a prior art scooter.
Figure 2:
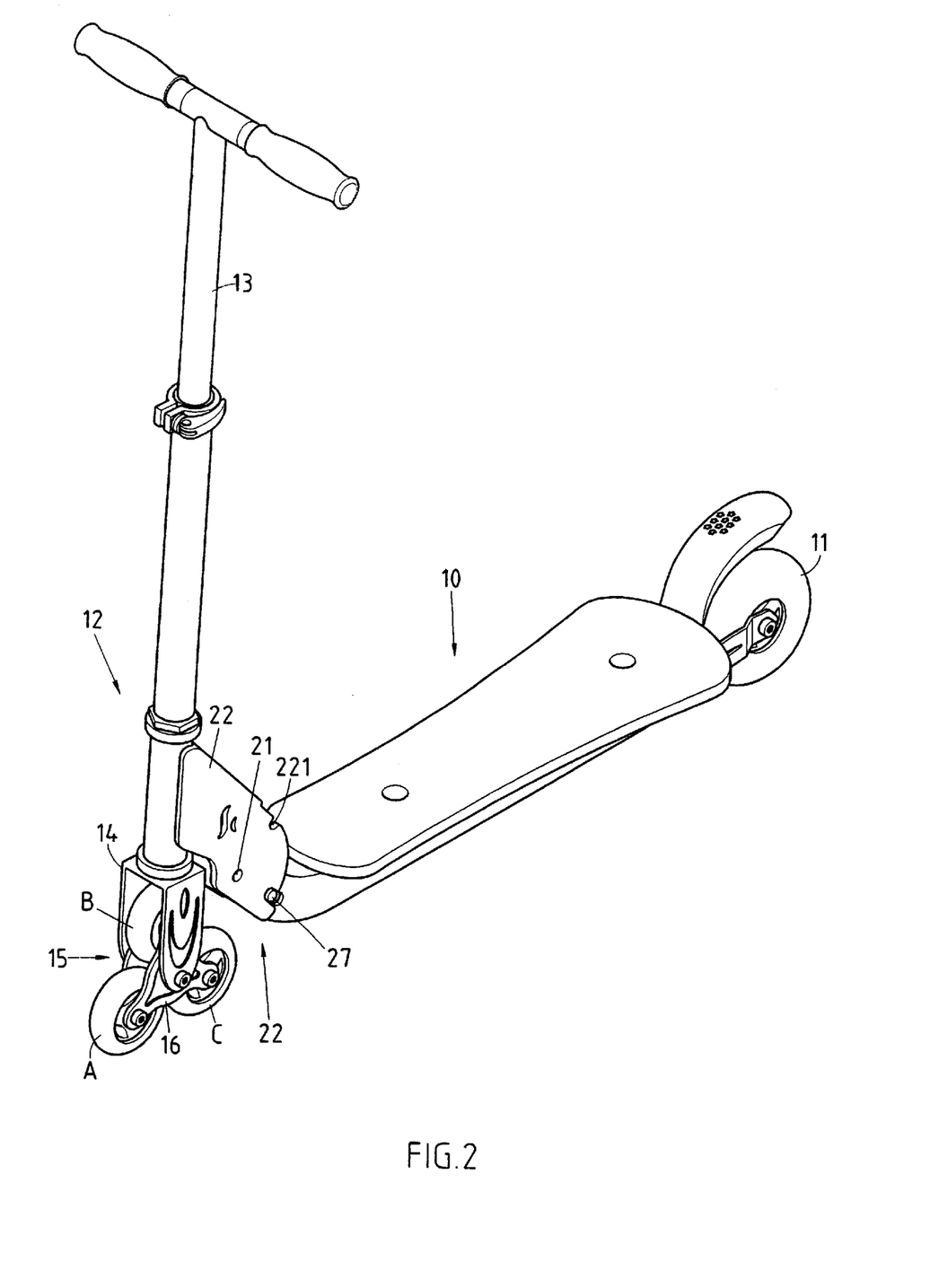
FIG. 2 shows a perspective view of a scooter of the present invention.

As shown in FIG. 1, the conventional scooter is generally formed of a handlebar, a footboard, a front wheel, and a rear wheel. The conventional scooter is susceptible to accidents, especially at the time when the scooter in motion encounters an obstacle, such as a pebble, a raised or angled surface, and the like. In other words, the conventional scooter is devoid of safety features to provide its rider with protection against injuries.

BRIEF SUMMARY OF THE INVENTION

The primary objective of the present invention is to provide a scooter with three front wheels which are pivoted to a locating plate to enhance the performance of the scooter.

It is another objective of the present invention to provide a scooter with a folding member enabling the handlebar of the scooter to be folded so as to facilitate the storage and the transportation of the scooter.

The foregoing objectives, features, and advantages of the present invention will be more readily understood upon a thoughtful deliberation of the following detailed description of the present invention with reference to the accompanying drawings.

DETAILED DESCRIPTION OF THE INVENTION

As shown in FIGS. 2–9, a scooter embodied in the present invention comprises a footboard 10, a rear wheel 11 pivoted to the rear end of the footboard 10, a front wheel rod 12 which is fastened to the front end of the footboard 10 by a folding member 20, a handlebar 13 fastened to the top end of the front wheel rod 12, a wheel frame 14 fastened to the bottom end of the front wheel rod 12, and a front wheel member 15 fastened pivotally to the wheel frame 14.

Figure 3:
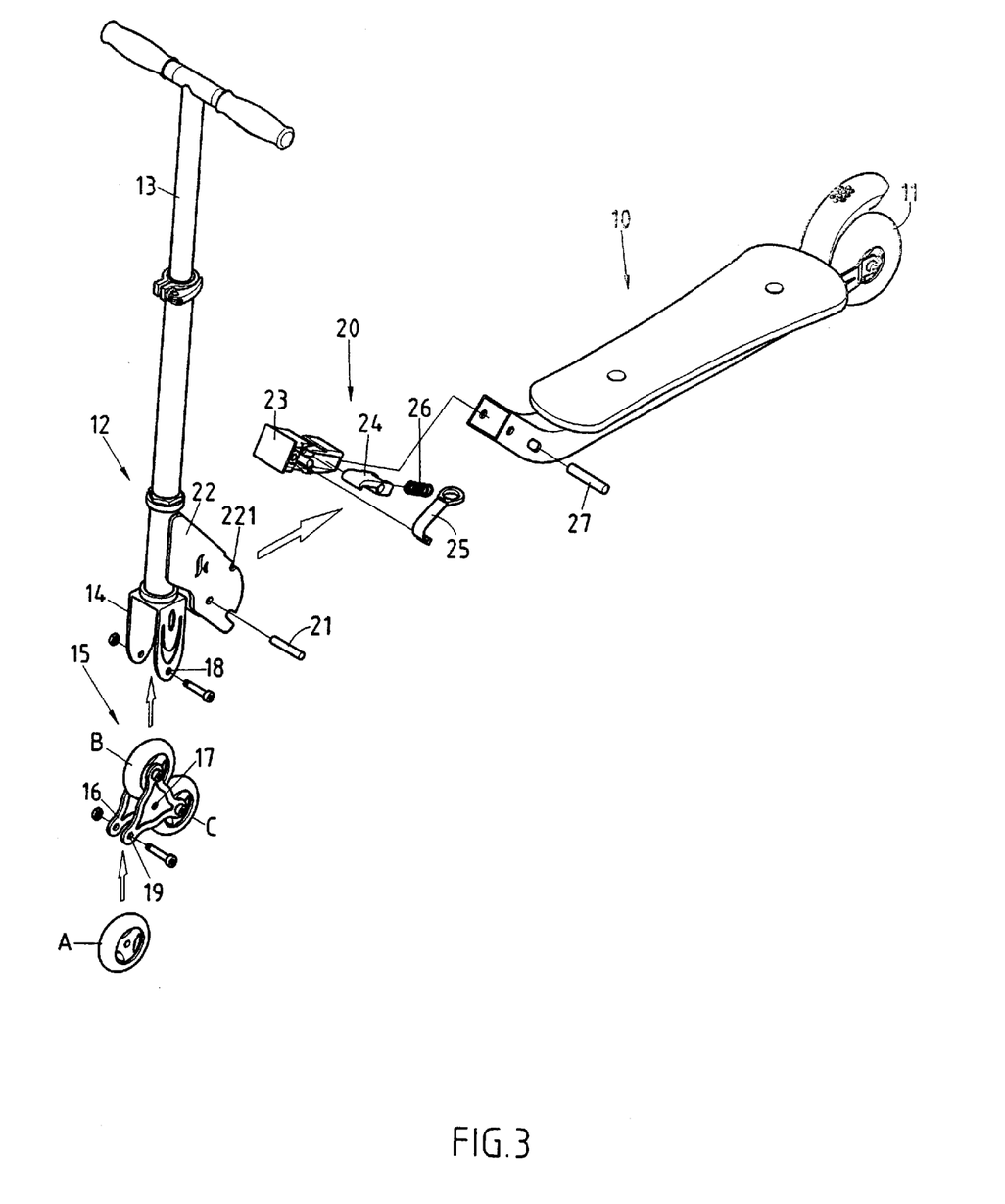
FIG. 3 shows an exploded view of the scooter of the present invention.
Figure 4:
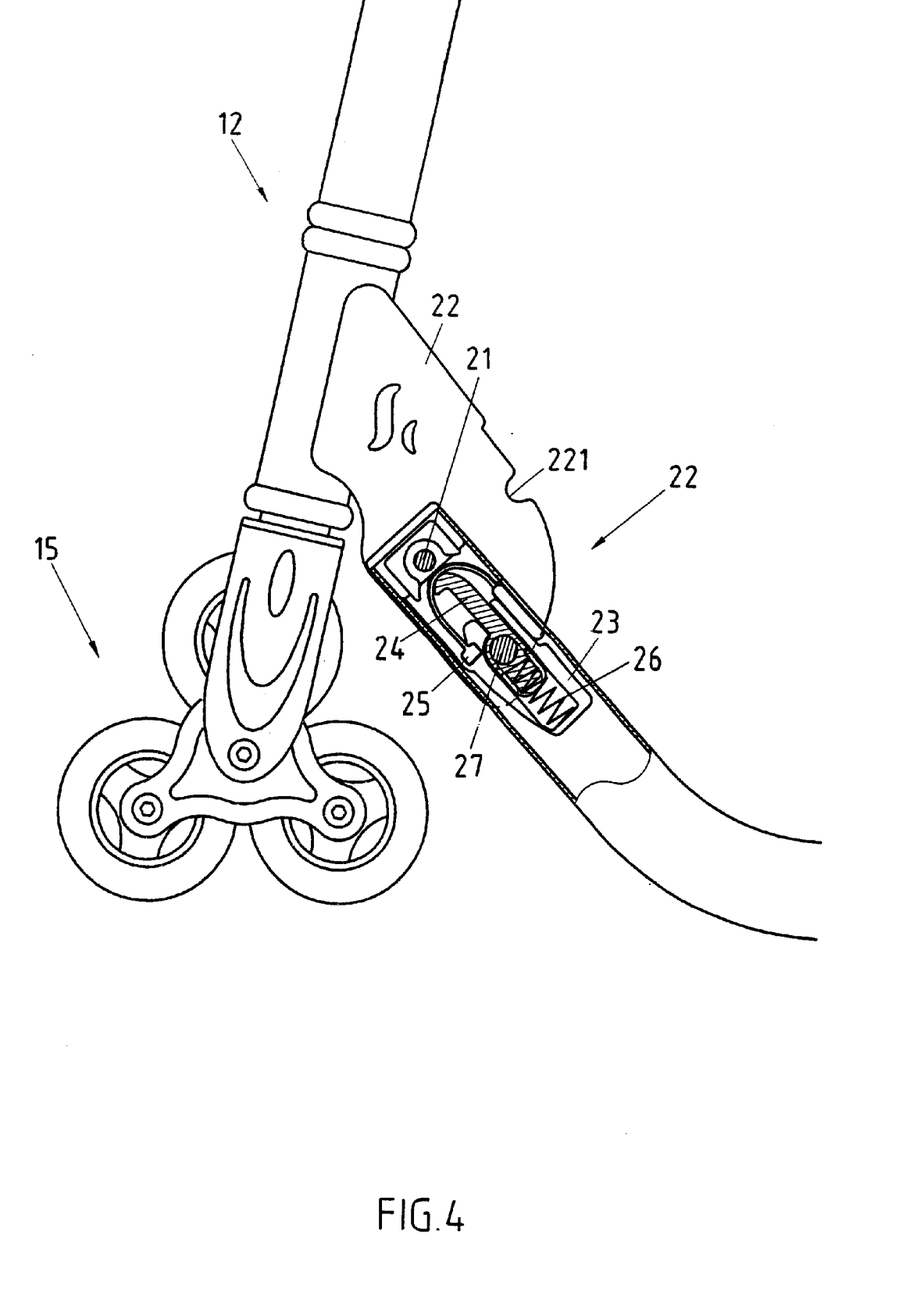
FIGS. 4–7 are schematic views of the folding of the scooter of the present invention.
Figure 5:
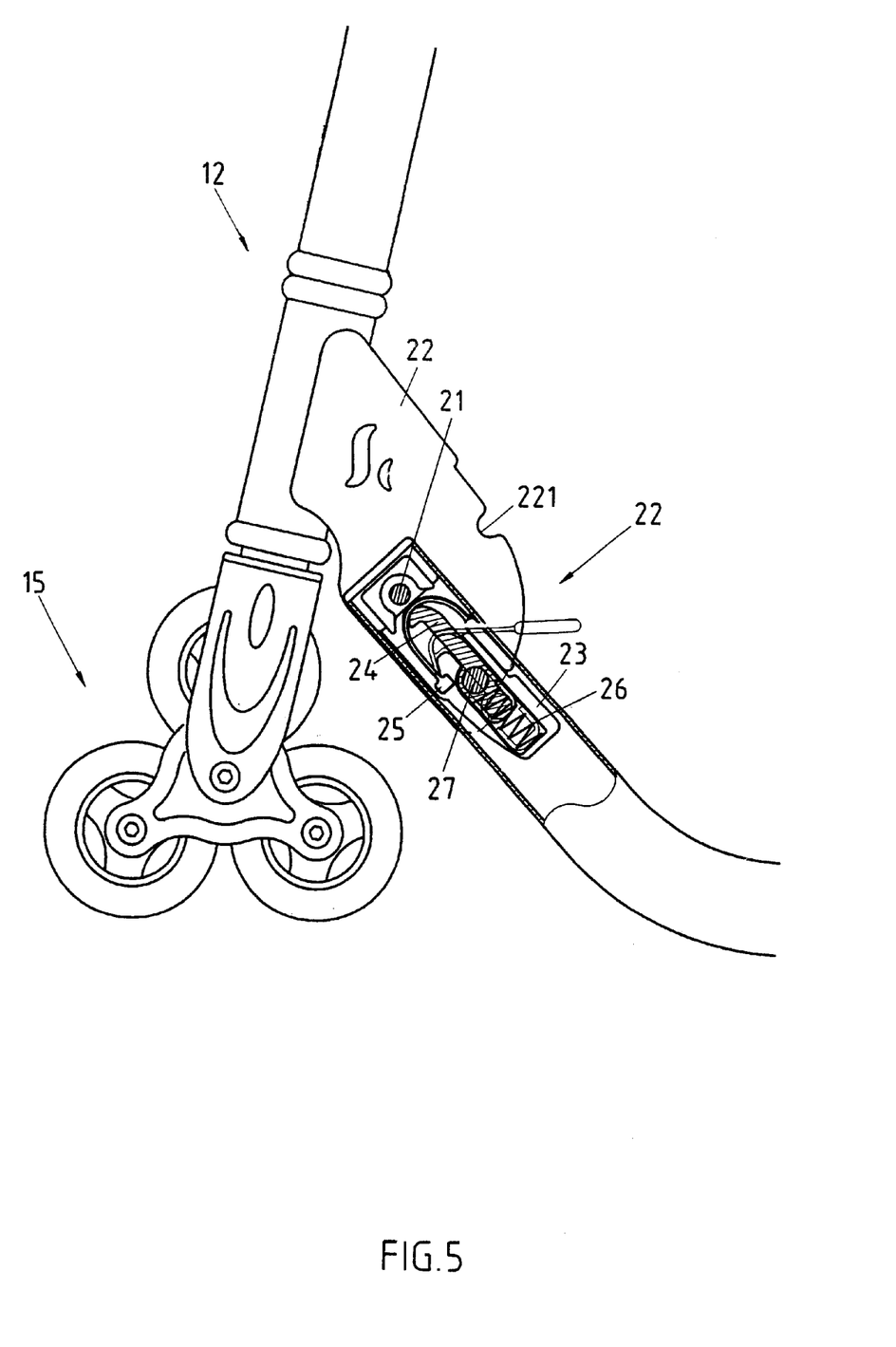
Figure 6:
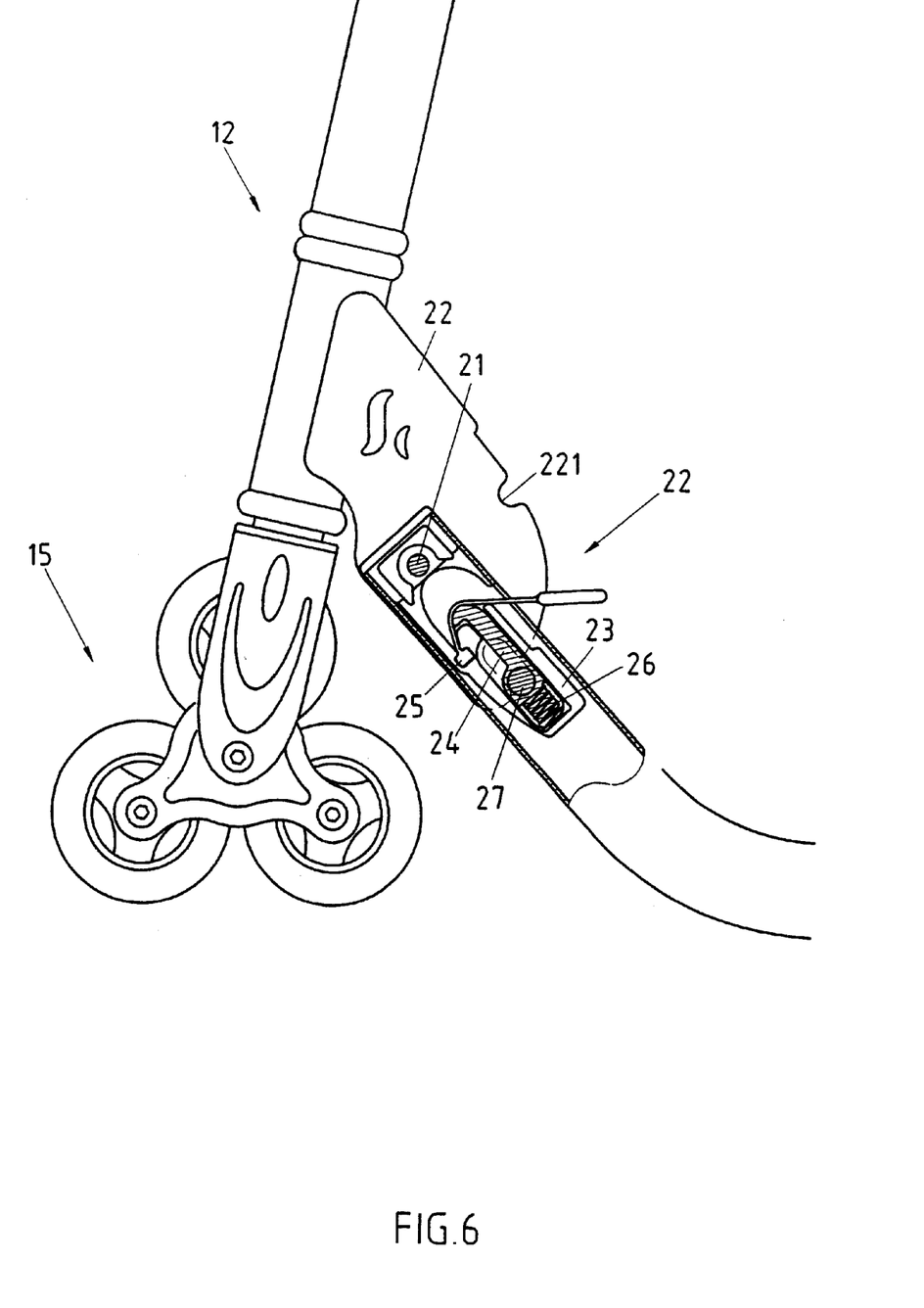
Figure 7:
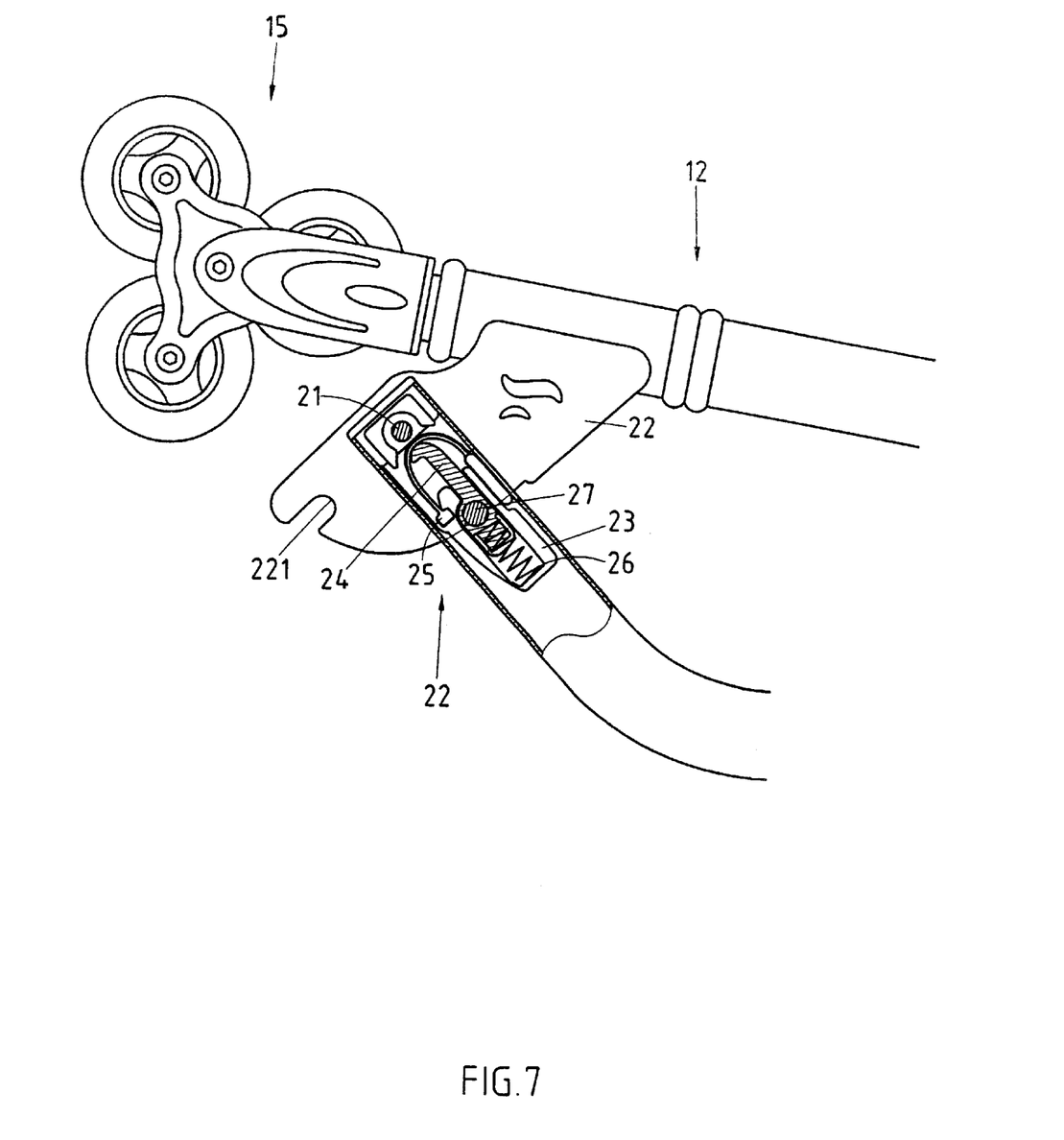
Figure 8:
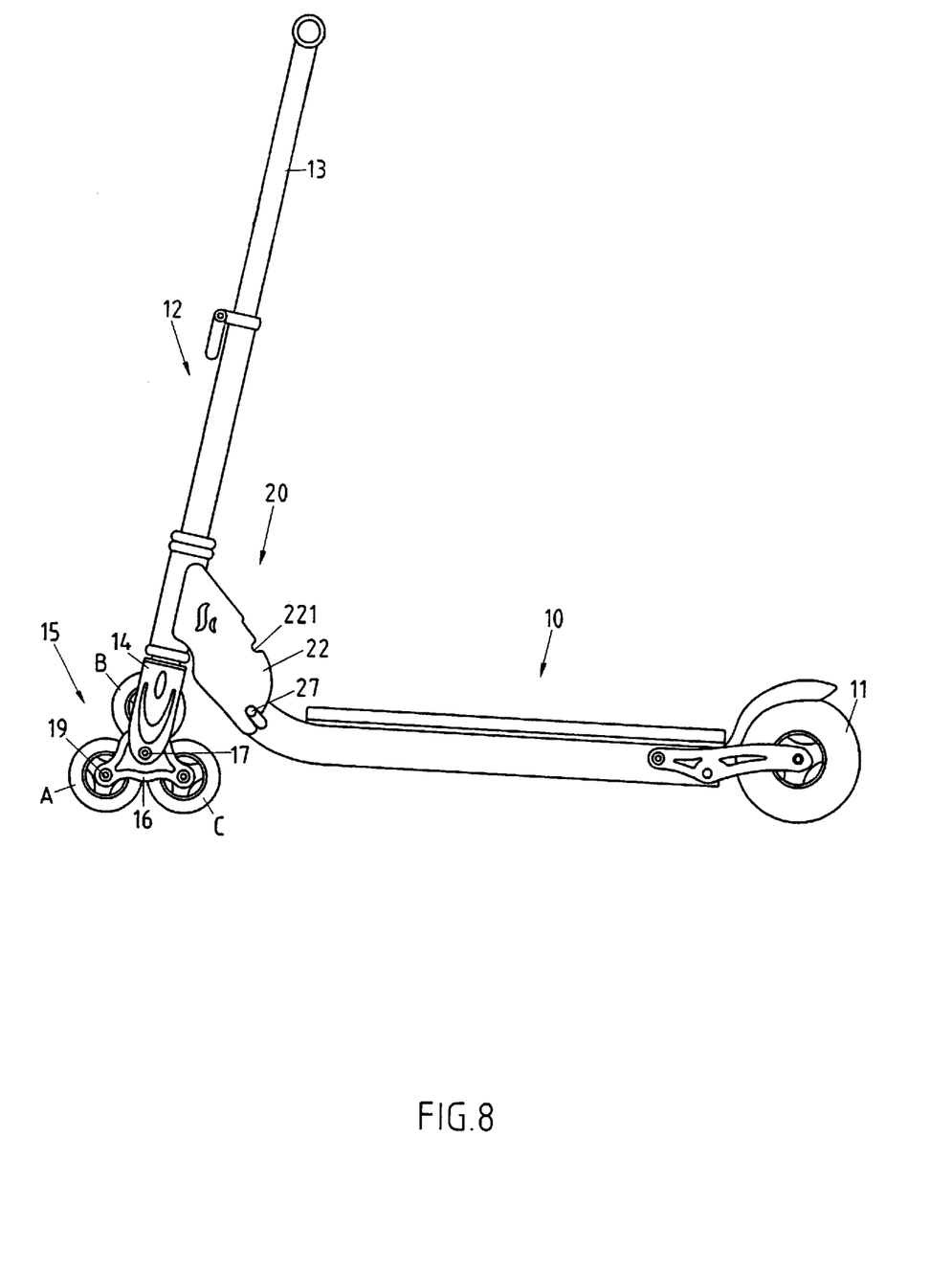
FIG. 8 shows a side schematic view of the scooter of the present invention in use.
Figure 9:
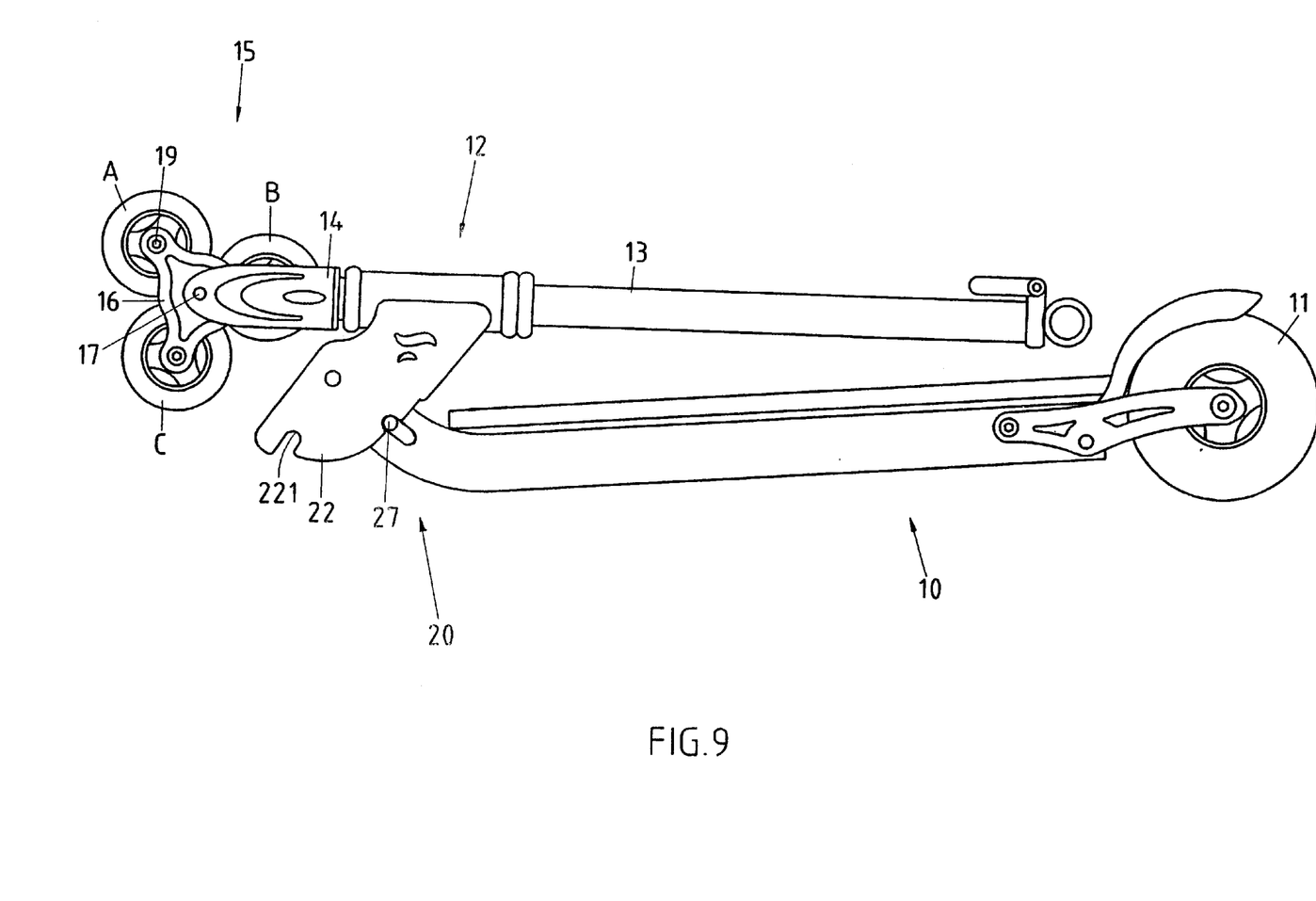
FIG. 9 shows a side schematic view of the scooter of the present invention in the folded state.

The front wheel member 15 is formed of three front wheels "A", "B", and "C", which are pivoted to a locating plate 16. The locating plate 16 is provided to a pivoting hole 17 by which the locating plate 16 is fastened pivotally to the wheel frame 14 by a pivot which is received in the pivoting hole 17 and two pivoting holes 18 of the wheel frame 14.

Figure 10:
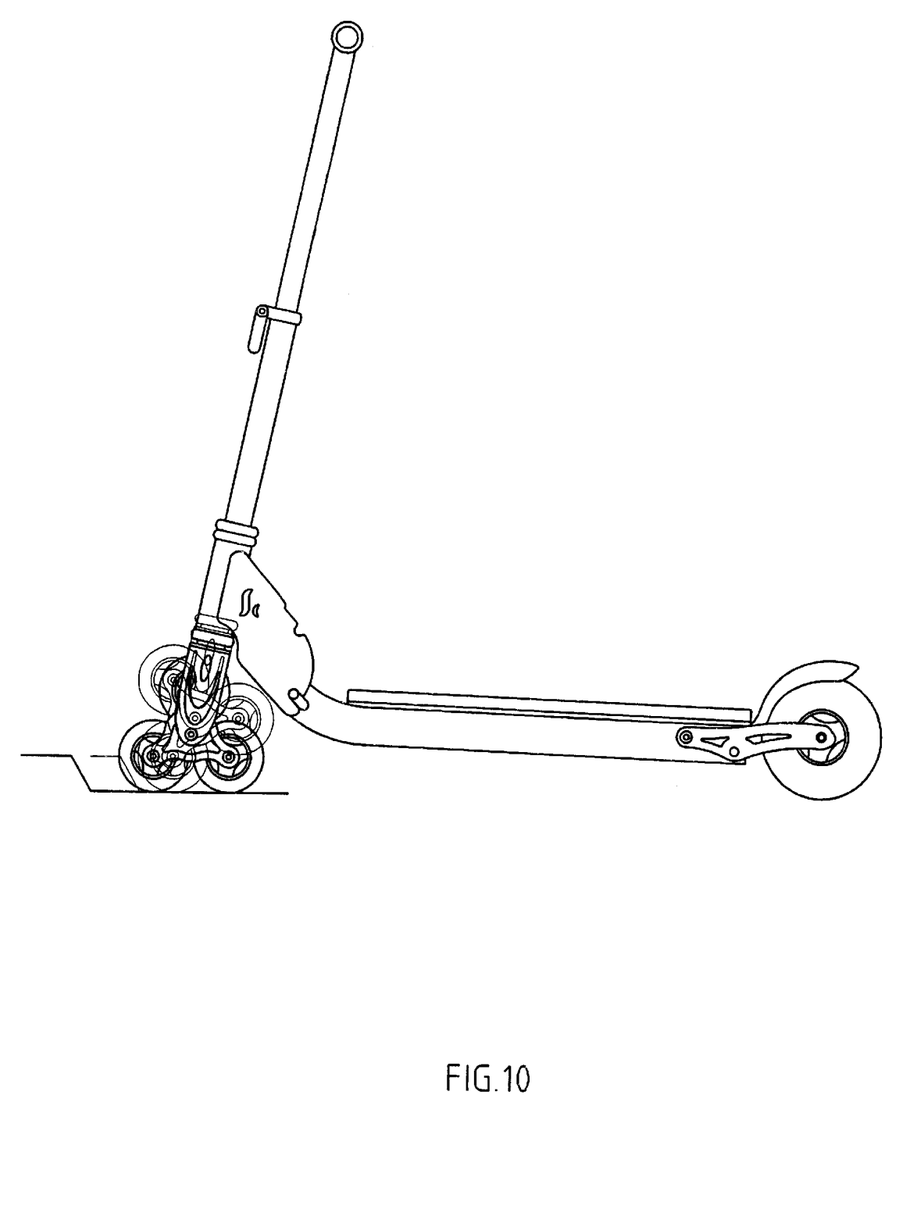
FIGS. 10–12 are schematic views to show that the scooter of the present invention overcomes a raised surface.
Figure 11:
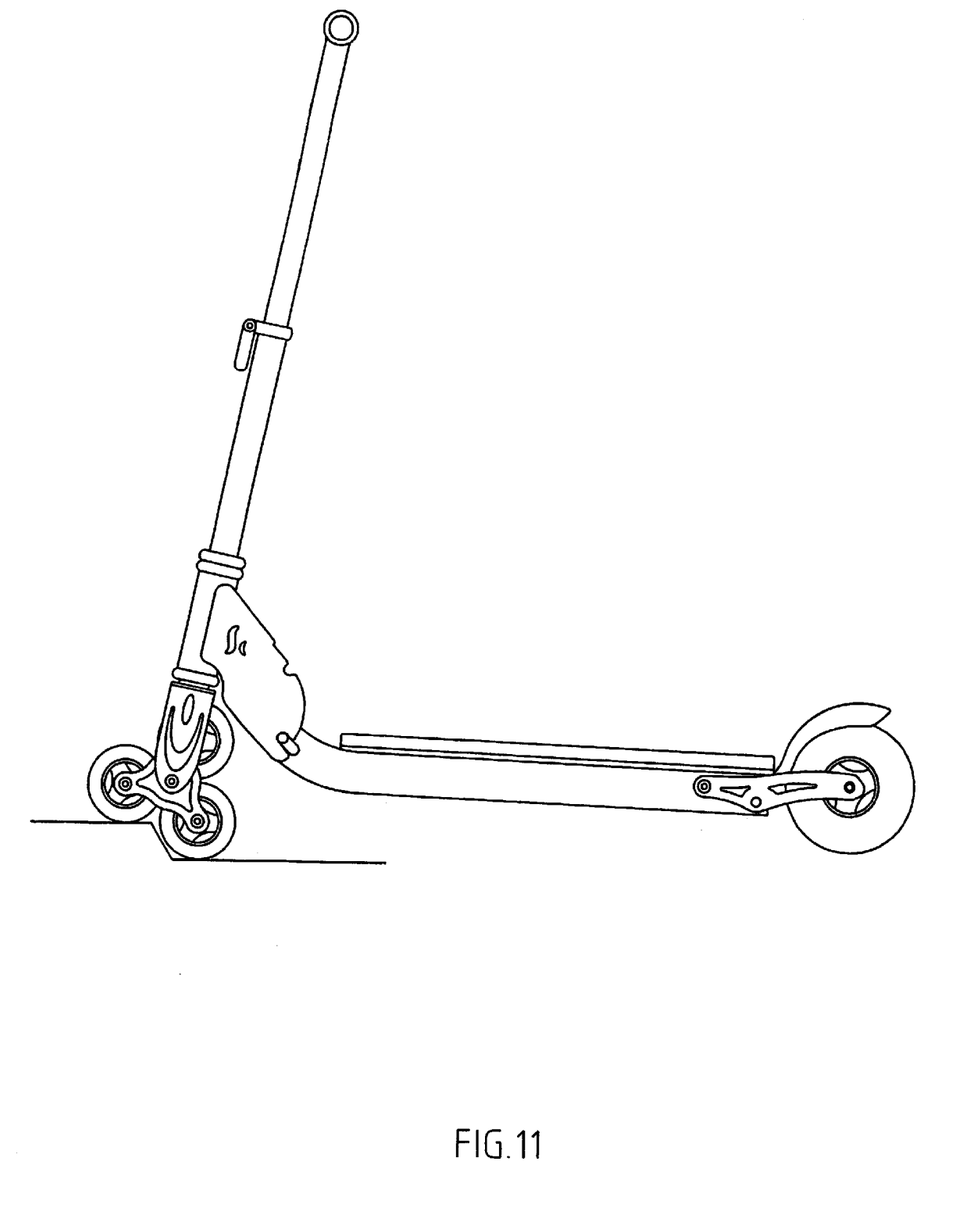
Figure 12:
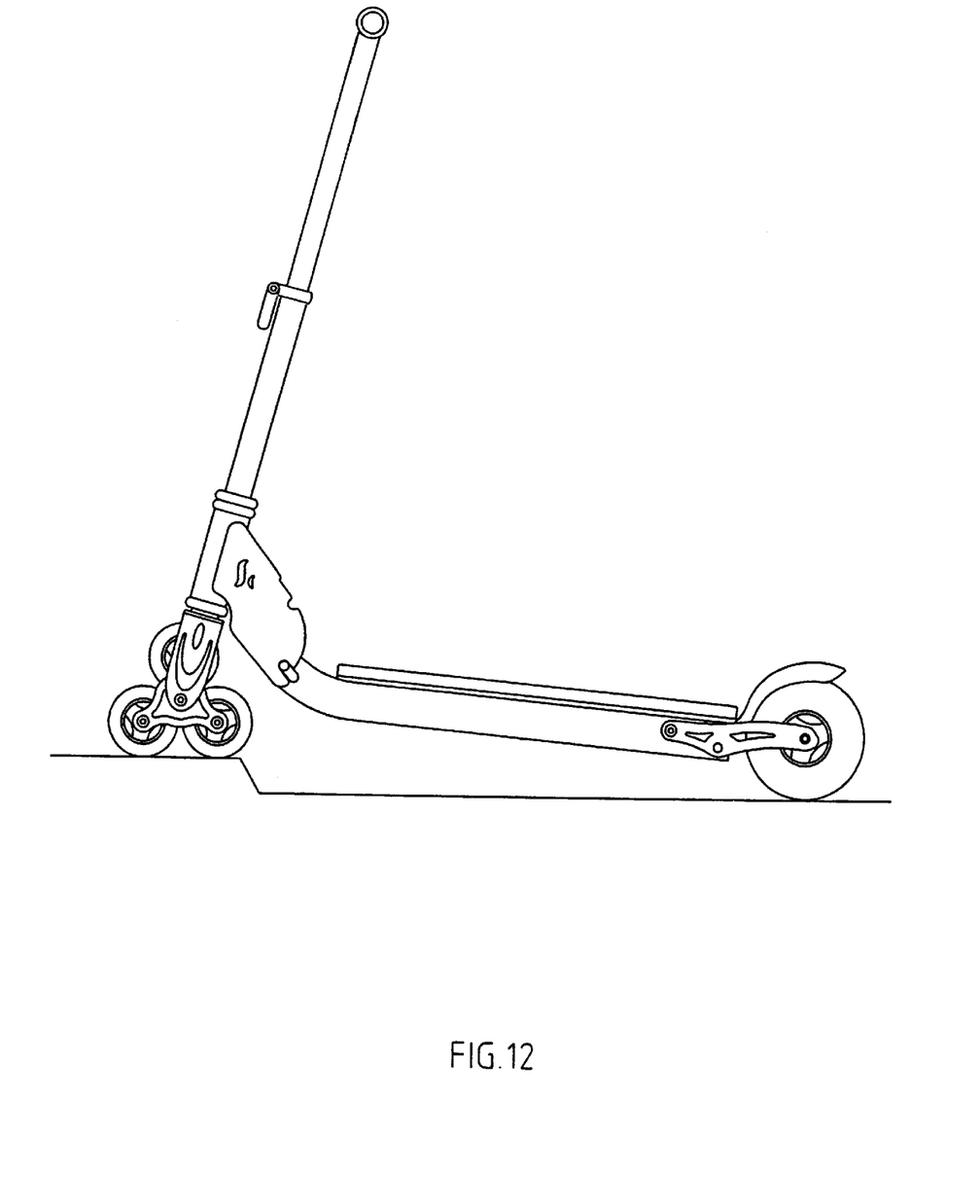

Each of the three front wheels is pivoted to the locating plate 16 by a pivot 19. The three front wheels are arranged in such a manner that two front wheels "A" and "C" are in contact with the surface, and that one front wheel "B" is located over the two front wheels "A" and "C". When the leading front wheel "A" encounters an obstacle, the locating plate 16 is caused to swivel such that the front wheel "B" comes in contact with the surface on which the obstacle is located, thereby enabling the scooter in motion to overcome the obstacle and to move ahead.

The folding member 20 comprises two locating pieces 22, a rotary shaft fitting member 23, a slide block 24, a pull handle 25, a spring 26, and a locating bolt 27.

The two locating pieces 22 are fastened at one end to the front wheel rod 12 and are provided at the other end with two retaining slots 221. The two locating pieces 22 are further provided with a pivoting hole for pivoting the locating pieces 22 with the front end of the footboard 10 by a pivot 21.

The rotary shaft fitting member 23 has a receiving space in which the slide block 24, the spring 26, and the pull handles 25 are disposed.

The rotary shaft fitting member 23 is fastened to the front end of the footboard 10 by a locating bolt 27 which is put through the slide block 24 such that the locating bolt 27 is removably retained in the retaining slots 221 of the two locating pieces 22 of the folding member 20. As the pull handle 25 is pulled, the slide block 24 is actuated to cause the locating bolt 27 to displace, thereby causing the locating bolt 27 to move out of the first retaining slots 221 of the locating pieces 22 of the folding member 20. As a result, the front wheel rod 12 can be swiveled on the pivot 21 toward the footboard 10 until the locating bolt 27 is located at the second retaining slots 221 of the locating pieces 22. As the pull handle 25 is let go, the slide block 24 is forced by the spring 26 to actuate the locating bolt 27 to move into the second retaining slots 221 of the folding member 20.

What is claimed is:

1. A scooter comprising:
   a footboard;
   a rear wheel pivoted to the rear end of said footboard;
   a front wheel rod fastened to a front end of said footboard in conjunction with a folding member;
   a handlebar fastened to a top end of said front wheel rod;
   a wheel frame fastened to a bottom end of said front wheel rod; and
   a front wheel member fastened pivotally to said wheel frame;
   wherein said wheel frame is provided with a locating plate fastened pivotally thereto by a pivot;
   wherein said front wheel member comprises a first front wheel pivoted to said locating plate by a pivot, a second front wheel pivoted to said locating plate by a pivot, and a third front wheel pivoted to said locating plate by a pivot, said second front wheel being located over said first front wheel and said third front wheel, said first front wheel and said third front wheel being in contact with the ground surface so that said locating plate is caused to swivel and said second front wheel comes in contact with the ground surface at such time when said first front wheel encounters an obstacle.

2. The scooter as defined in claim 1, wherein said folding member comprises:
   two locating pieces fastened at one end to said front wheel rod and provided at another end with a first and a second retaining slots, said two locating pieces being pivoted to the front end of said footboard; and a rotary shaft fitting member comprising a slide block, a pull handle, and a spring, said rotary shaft fitting member being fastened to the front end of said footboard by a locating bolt which is put through said slide block such that said locating bolt is removably retained in said first retaining slots of said two locating pieces, and that said locating bolt is actuated by said slide block to displace so as to move out of said first retaining slots at such time when said pull handle is pulled by an external force, thereby enabling said front wheel rod to swivel toward said footboard until such time when said locating bolt is located at said second retaining slots of said locating pieces whereby said locating bolt is forced into said second retaining slots at the time when said pull handle is let go, thereby causing said slide block to be exerted on by the spring force of said spring such that said slide block actuates said locating bolt to move into said second retaining slots.

* * * * *